United States Patent [19]
Frank et al.

[11] Patent Number: 5,860,144
[45] Date of Patent: Jan. 12, 1999

[54] ADDRESSING METHOD AND SYSTEM FOR PROVIDING ACCESS OF A VERY LARGE SIZE PHYSICAL MEMORY BUFFER TO A NUMBER OF PROCESSES

[75] Inventors: Richard Frank, Groton, Mass.; Gopalan Arun; Richard Anderson, both of Nashua, N.H.; Stephen Klein, Hollis, N.H.

[73] Assignee: Oracle Corporation, Redwood Shore, Calif.

[21] Appl. No.: 695,027

[22] Filed: Aug. 9, 1996

[51] Int. Cl.⁶ .................................................. G06F 12/10
[52] U.S. Cl. ........................................... 711/206; 711/209
[58] Field of Search ................................... 711/203, 206, 711/209, 170; 395/406

[56] References Cited

U.S. PATENT DOCUMENTS

| | | | |
|---|---|---|---|
| 5,095,420 | 3/1992 | Eilert et al. | 711/209 |
| 5,237,668 | 8/1993 | Blandy et al. | 711/2 |
| 5,404,478 | 4/1995 | Arai et al. | 711/206 |
| 5,469,142 | 11/1995 | Bergman et al. | 340/572 |
| 5,734,910 | 3/1998 | Corrigan et al. | 395/734 |

*Primary Examiner*—Jack A. Lane
*Attorney, Agent, or Firm*—Wagner, Murabito & Hao

[57] ABSTRACT

An addressing method and system for accessing a very large size physical buffer by a number of processes. The novel system is applicable within a computer system having an n-bit computer operating system (e.g., where n is 16, 32, 64, etc.). The addressing method allocates a relatively small window of virtual address space, for each software process, which is used to access the very large physical buffer using a relatively small amount of operating system memory overhead. A page frame number (PFN) table of the system address space maintains a listing of physical memory pages used to define the very large physical buffer. The PFN table is used by each process to translate between a relative page number (RPN) and an address of a physical memory page containing the record. The virtual address space ("window") of each process is used to access the physical memory buffer and contains a hash table, a virtual access control block (VACB) free list, and a VACB table. Entries of the VACB table indicate addresses of virtual memory for the process. Each process also has an associated private page table entry (PTE) table which maintains a mapping between its virtual pages and the physical pages. To map a record, its RPN is determined and used to obtain the address of the physical page(s) in which the record resides. The free list supplies an entry of the VACB table containing a virtual address for the record. The virtual address and the physical address are mapped into the PTE table.

28 Claims, 13 Drawing Sheets

ADDRESSING METHOD AND SYSTEM FOR PROVIDING ACCESS OF A VERY LARGE SIZE PHYSICAL MEMORY BUFFER TO A NUMBER OF PROCESSES

BACKGROUND OF THE INVENTION

(1) Field of the Invention

The present invention relates to the field of computer systems. More specifically, the present invention relates to the field of memory addressing method and systems within computer systems.

(2) Prior Art

Large computer systems today contain memory management hardware and address systems to provide software processes ("processes") with access to a defined range of physical memory (e.g., hardware volatile memory). Operating systems within the computer system provide data structures which define and maintain virtual memory spaces which can be made private to each process. The virtual memory space is then used transparently by the process to access data that is actually maintained within the physical memory space. The above data structures provide a mapping between the addresses of the virtual memory space used by the process and the addresses of the physical memory space used by the computer system's hardware memory management systems which actually maintain the data in the physical memory. A typical such computer system can provide memory mappings for as many as 500 or more processes simultaneously.

One such prior art memory management system (e.g., running within the VMS operating system) is shown in FIG. 1A. Two virtual address memory spaces are shown as 10a and 10b for process 1 and process 2, respectively. Also shown is a large physical memory address size 20. The physical memory address space 20 is typically realized in volatile memory (e.g., random access memory). According to the memory management system of FIG. 1A, within a 32-bit operating system, the allowed size of each virtual memory space 10a and 10b is approximately 2 gigabytes (Gb), with another 2 GB of memory space being reserved for the operating system. The operating system allocates a working set of physical memory to each virtual address space 10a, 10b. Working set 22a is allocated for virtual memory space 10a and working set 22b is allocated for virtual memory space 10b. In a 32-bit operating system, the typical size allowed for a given working set is about 10–20 megabytes (Mb), however, in some database applications a maximum of 0.25 Gb can be reserved. In a prior art 32-bit operating system, a maximum of 4 Gb of physical memory can be addressed. Therefore, the size of the working set is restricted by the operating system due to fairness concerns so that each process has sufficient access to the 4 Gb of physical memory.

A working set is divided into pages of physical memory, e.g., one page 24a is shown for working set 22a and one page 24b is shown for working set 22b. The size of a page is programmable, but one typical size is 8 kilobytes (Kb). When a process accesses data, it utilizes addresses within its virtual address space which are converted by a page table data structure into addresses within pages of the process's working set within the physical memory space 20. The operating system uses the page tables of each process to map pages of physical memory space 20 into the virtual address space (10a, 10b) that the process can access.

FIG. 1B illustrates three exemplary page table data structures 30a, 30b and 30n for process 1, process 2, and process n, respectively. The page table data structures 30a, 30b, and 30n are stored in the operating system's address space and maintain the mapping between a process's virtual addresses and the addresses of pages within the physical memory space 20. For each process, virtual addresses are received (e.g., over lines 32a, 32b, and 32n) and the appropriate page address of the physical memory space are output by the tables (e.g., over buses 34a, 34b, and 34n). Since many processes can operate simultaneously (e.g., 500 or more), many page tables can be simultaneously accessed and need to be simultaneously maintained.

In the addressing mechanism of FIG. 1A and FIG. 1B, many more physical memory pages can be assigned to a process than fit within the memory size of the working set for that process. In other words, the virtual memory size in the prior art memory addressing system, for a single process, is very much larger than the allocated working set size. In this case, as additional physical memory pages are needed by the process, they are retrieved from a non-volatile memory storage (e.g., disk 104 of FIG. 1A) and copied into the working set 22a, 22b for that process, overwriting other pages that might currently exist within the working set 22a, 22b. Conversely, if a page of a working set 22a, 22b is not currently required, it is stored in the non-volatile storage 104 to free up space within the working set 22a, 22b for other information. The above "swapping" of pages to and from the non-volatile storage 104 and the volatile working sets 22a, 22b is called "paging." Therefore, within the prior art memory addressing mechanism of FIG. 1A and FIG. 1B, disk input/output accesses are constantly being performed to flow data into and out of the working sets 22a, 22b because the virtual addressing spaces 10a, 10b of the processes are much larger than the working sets 22a, 22b. This constant I/O accessing (at approximately 30 accesses per second) reduces the overall performance of this memory addressing mechanism. Because this prior art addressing mechanism provides each process with a large amount of virtual memory space (e.g., 2 Gb in a 32-bit operation system) and a relatively small amount of physical memory space (e.g., 0.25 Gb), it is referred to herein as a "virtual memory centric" system.

Aside from the above performance disadvantage, the page table data structures 30a–30n of the prior art addressing mechanism of FIG. 1A and FIG. 1B consume a relatively large amount of operating system memory to maintain. For instance, the memory space required to maintain page table data structures 30a–30n for 500 processes, each process having 1 Gb of private virtual memory, requires at least 2 Gb of operating system memory. In a 32-bit operating system, the 2 Gb memory used by the data structures 30a–30n consumes half of the memory space available (4 Gb) to the operating system of the computer system. Such memory usage for mapping overhead is not an effective use of memory resources. The above disadvantageous operating system memory consumption results because the prior art addressing mechanism allocates a relatively large amount of virtual memory space for each process which can be as large as the physical memory space available, thus increasing the size of each page table data structure (e.g., of 30a–30n). Further, because the prior art statically allocates, on a per process basis, enough address space to map the entire physical buffer, depending on the operating system implementation, this can result in page table entry duplication on a per process basis, resulting in high system memory consumption.

The above performance and system memory consumption disadvantages are not alleviated or reduced within computer systems that contain 64-bit operating systems and/or 64-bit directly addressable physical memory spaces under the prior art addressing mechanism. Indeed, within these systems, the above performance and system memory consumption disadvantageous are exacerbated because the required sizes of the page table data structures per process are increased. Moreover, although 64-bit addressable physical memory provides a substantial amount of volatile memory storage, the prior art addressing mechanism still limits the size of the working set to 0.25 Gb per process. This is especially true for 32-bit operating systems having 64-bit directly addressable physical memory. Therefore performance disadvantages result due to heavy disk I/O operations. For 64-bit operating systems having 64-bit directly addressable physical space, the larger limiting factor concerns the immense size of the page table data structures within the operating systems address space.

To maximize system performance, database software and systems executing database software require access to very large memory (VLM) caches. On existing 16-bit and 32-bit operating systems, these VLM caches are limited by the maximum virtual address space recognized by the operating system, which can be at most 4 Gb, and is usually much less (e.g., 2 Gb). Therefore, in addition to the disadvantages noted above, the prior art addressing technique is also disadvantageous because it limits the amount of physical memory addressable to a process to 4 Gb in a computer system having a 32-bit operating system but 64-bit physical addressability. The prior art addressing mechanism is also disadvantageous because it requires a substantial amount of redesigning to operate with a computer system offering 64-bit physical addressability. Without the required redesign, a 32-bit operating system of the prior art addressing mechanism would inherently limit the amount of physical memory that could be efficiently addressed.

Accordingly, what is needed is an addressing system that eliminates the above performance and system memory consumption disadvantages of the prior art system. What is needed is an addressing system that can provide a particular process with access to more physical memory space than 0.25 Gb without requiring disk I/O operations during paging. Further, what is needed is an addressing system that can provide the above advantages within both 32 and 64-bit operating systems that have either 32 or 64-bit physical addressability. More particularly, what is needed is an addressing system that can provide processes within a 32-bit operating system with access to more physical memory space than 4 Gb within computer systems having a 64-bit physical addressability. The above is needed without requiring a substantial redesigning of the memory addressing system. The present invention memory addressing system provides the above features and others not necessarily recited above but clear within further discussions of the present invention herein.

SUMMARY OF THE INVENTION

A physical memory centric addressing method and system are described for accessing a very large size physical memory buffer by a number of processes. The novel system is applicable within a computer system having an n-bit computer operating system (e.g., where n is 16, 32, 64, etc.) and having y-bit physical addressability (e.g., where y is 32, 64, etc.). The addressing method allocates a relatively small window of virtual address space ("virtual window") for each software process. The virtual window is used to access the very large physical memory buffer using a relatively small amount of operating system memory overhead. A page frame number (PFN) table, stored within the operating system address space, maintains a listing of physical memory pages used to define the very large physical buffer. The PFN table is used by each process to translate between a relative page number (RPN) of a database record and an address of a physical memory page containing the data for the record. The virtual window of each process is used to access the physical memory buffer; the virtual window includes a hash table, a virtual access control block (VACB) free list, and a VACB table data structure. The VACB table indicates addresses of virtual memory space of the virtual window. Each process also has an associated page table entry (PTE) table data structure which maintains a mapping between its virtual address pages and the physical address pages. To map a record, its RPN is determined and used to obtain the address of the physical page(s) in which the record resides. The free list supplies a VACB table entry containing a virtual address for the record. The virtual address and the physical address are then mapped into the PTE table. The above system effectively provides ready access to over 4 Gb of physical memory to database processes executing within a 32-bit operating system.

More specifically, embodiments of the present invention include an addressing system within a computer system having a processor coupled to bus and a memory coupled to the bus, the addressing system providing a process with access to a large physical memory space, the addressing system comprising: (a) a first table comprising a plurality of entries, each entry corresponding to a page of the physical memory space, the first table stored in the memory; (b) a virtual window associated with the process and representing a relatively small amount of virtual address space compared to the physical memory space, the virtual window comprising a control block table stored in the memory, the control block table comprising a plurality of control block entries, each control block entry representing a page of virtual memory within the virtual window; and (c) a page table entry data structure stored in the memory and corresponding to the process, the page table entry data structure comprising a plurality of entries, each entry for mapping a page of virtual memory of the process to a page of physical memory, wherein data records of the physical memory space are mapped into the virtual window of the process by associating, within the entries of the page table entry data structure, physical page addresses of the data records with vacant virtual page addresses of the virtual window.

Embodiments of the present invention include the above and wherein the process operates within a 32-bit operating system of the computer system and the large physical memory space is 64-bit addressable. Embodiments of the present invention include the above and wherein the large physical memory space is equal to or larger than 4 Gb in size and wherein the virtual address space is between 1 and 2 Mb in size.

DETAILED DESCRIPTION OF THE INVENTION

In the following detailed description of the present invention physical memory centric addressing system and method, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., 112 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

COMPUTER SYSTEM ENVIRONMENT

Figure 1A:
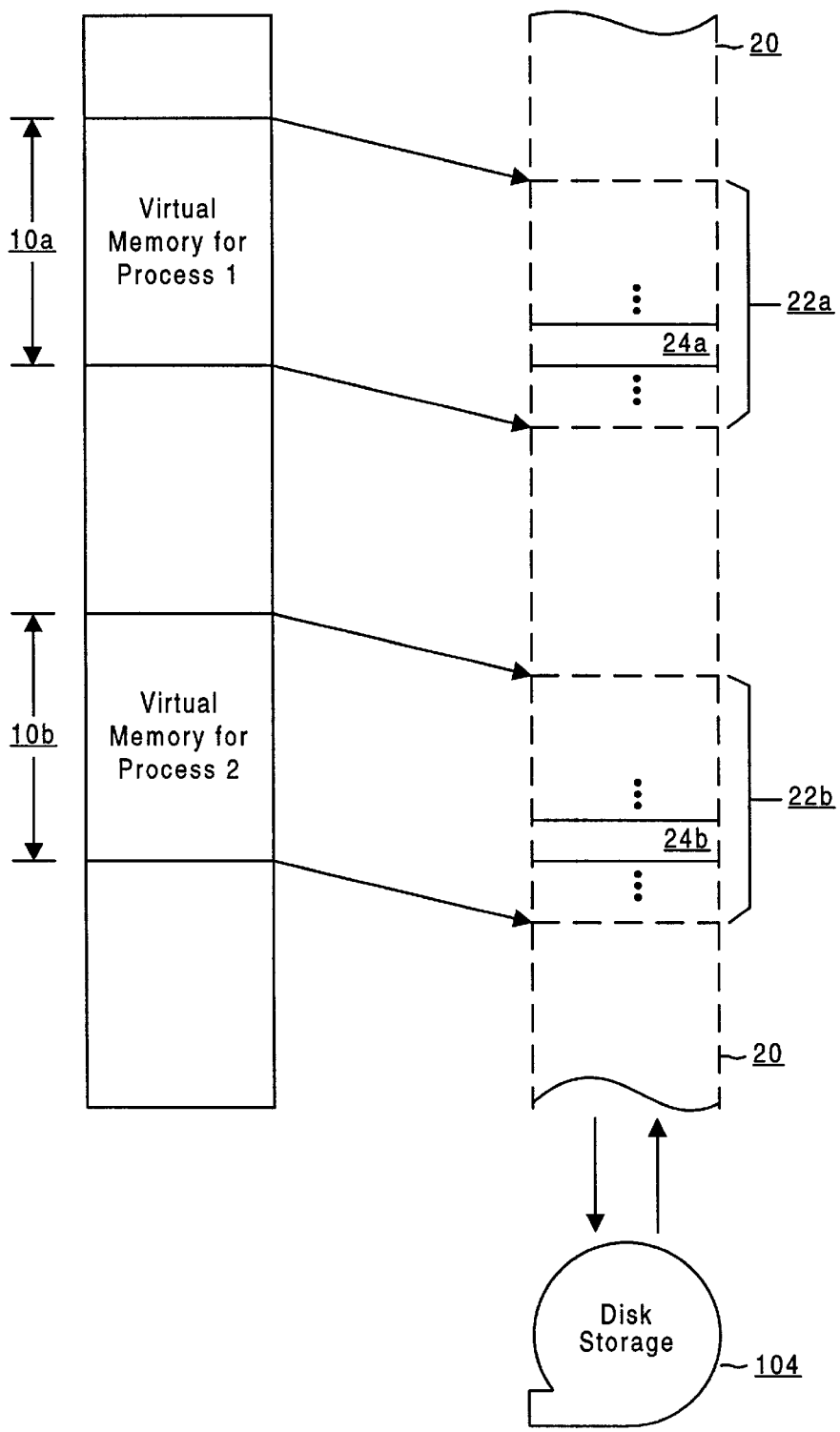
FIG. 1A illustrates a memory addressing mechanism used in the prior art virtual memory centric based systems.
Figure 1B:
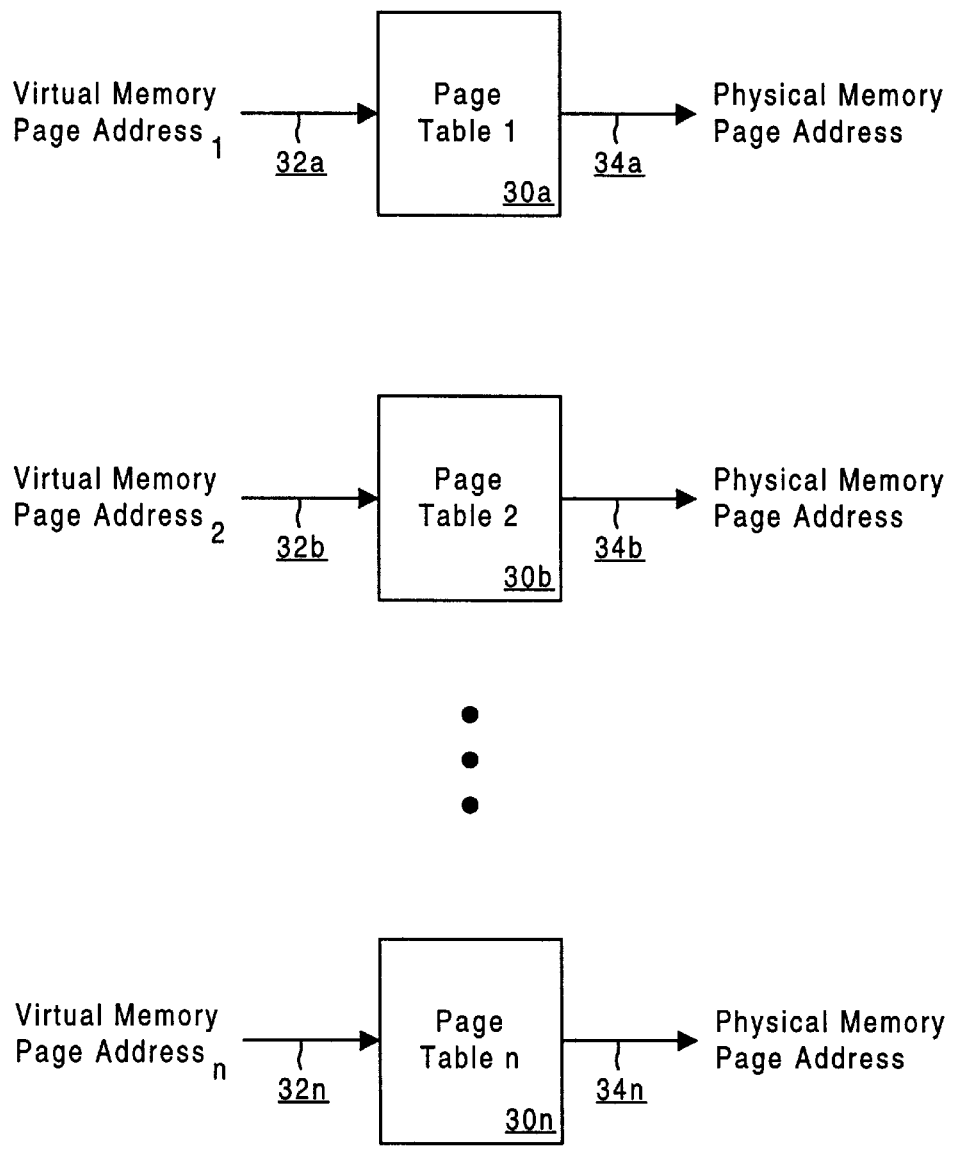
FIG. 1B illustrates page tables used in the prior art virtual memory centric memory addressing mechanism.
Figure 2:
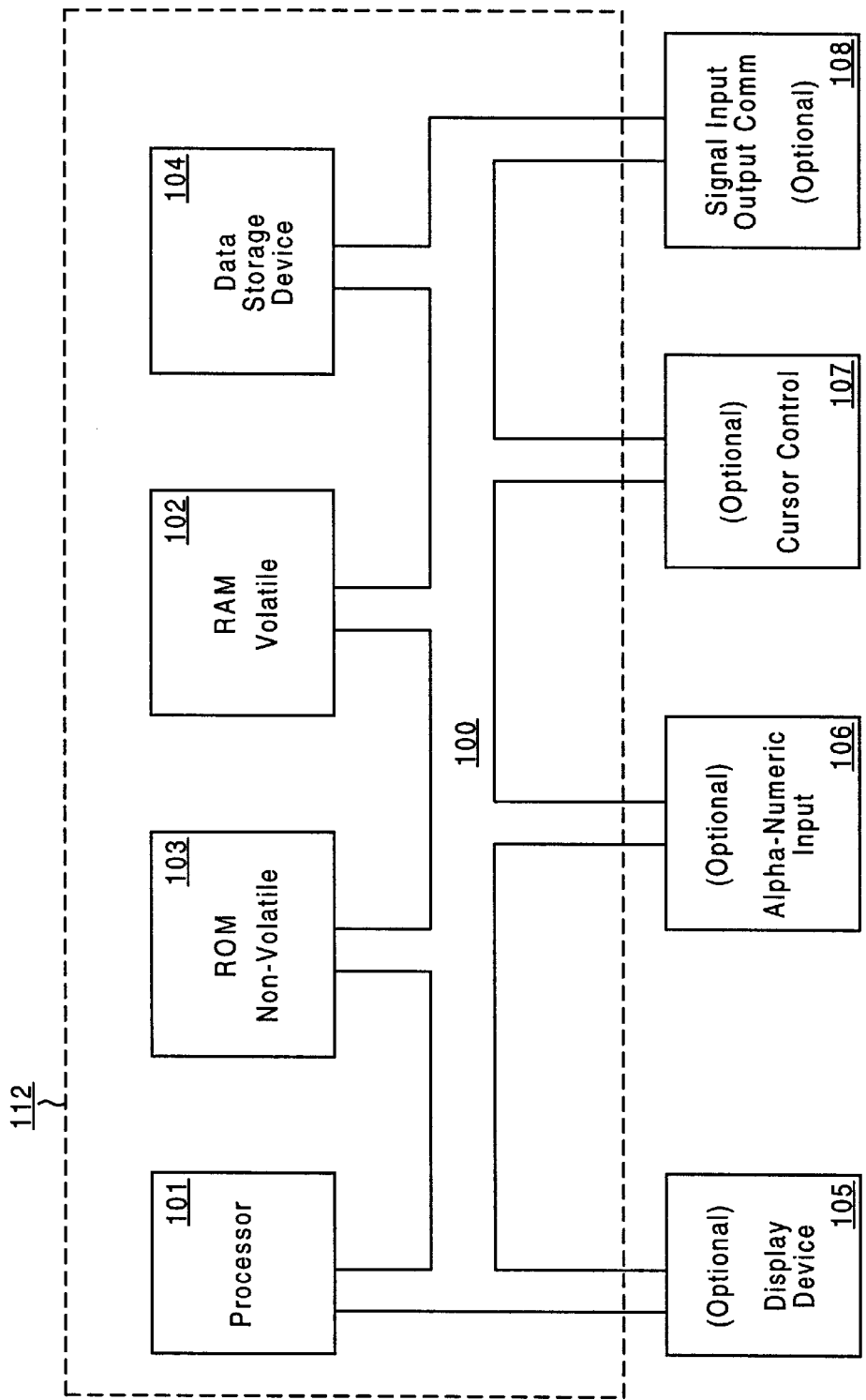
FIG. 2 illustrates a general purpose computer system utilized within the present invention physical memory centric addressing system.

Refer to FIG. 2 which illustrates a computer system 112. Within the following discussions of the present invention, certain processes and steps are discussed that are realized, in one embodiment, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 such as a magnetic or optical disk and disk drive coupled with the bus 100 for storing information and instructions. Optionally, system 112 can include a display device 105 coupled to the bus 100 for displaying information to the computer user, an alphanumeric input device 106 including alphanumeric and function keys coupled to the bus 100 for communicating information and command selections to the central processor(s) 101, a cursor control device 107 coupled to the bus for communicating user input information and command selections to the central processor(s) 101, and a signal generating device 108 coupled to the bus 100 for communicating command selections to the processor(s) 101. In one embodiment, system 112 is a DEC Alpha computer system by Digital Equipment Corporation.

ADDRESSING SYSTEM AND METHOD OF THE PRESENT INVENTION

The present invention memory addressing system and method are physical memory centric. That is, the present invention provides each process of computer system 112 with access to a large amount of physical memory space while providing only a small window of virtual address space with which to access the physical memory. To address more physical memory than the virtual window size, the mapping of the virtual window is dynamically altered so that the small virtual window is remapped across the physical memory. The address system and methods of the present invention are integrated within an existing operating system and bypass the operating system's addressing system and take control of the underlying hardware addressing resources. However, the operating system's existing memory addressing systems are used by the present invention to generate and maintain certain data structures which are described below. By bypassing the operating system's existing memory addressing systems, the present invention can be readily integrated within a 32-bit operating system to provide 64-bit addressability without requiring a substantial redesign of the memory addressing routines of the 32-bit operating system.

Within the present invention, a large amount of physical memory is provided to a particular process while requiring only minimum disk I/O accesses that are greatly required of the prior art paging operations. Within the present invention, I/O access operations to the disk 104 are greatly reduced, and in many cases can be eliminated completely within computer system 112 to thereby increase system performance. As described below, each process contains a small virtual memory window containing certain data structures. Each process also contains a page table entry data structure. Within the present invention, the system memory overhead consumption for these data structures, per process, is typically less than 8 Kb (e.g., assuming a record size, m, of 200, as explained below).

All processes access a single page frame number (PFN) table which maintains a single physical memory buffer. Multiple separate physical memory buffers are possible. Since a relatively small amount of virtual memory is made available to each process and a large amount of physical memory can be allocated through the window, the present invention (1) significantly reduces the operating system memory overhead required to maintain the memory mapping and also (2) increases memory access performance by significantly reducing the amount of required disk I/O operations. The addressing system of the present invention also allows processes executing within a 32-bit operating system to access a very large physical buffer cache (e.g., well over 4 Gb of physical memory space).

DATA STRUCTURES OF PRESENT INVENTION

Although the present invention is described below in relation to a 32-bit operating system, in one embodiment, it is appreciated that the present invention is equally well suited to operate within a 64-bit operating system, or other sized operation system.

Figure 3A:
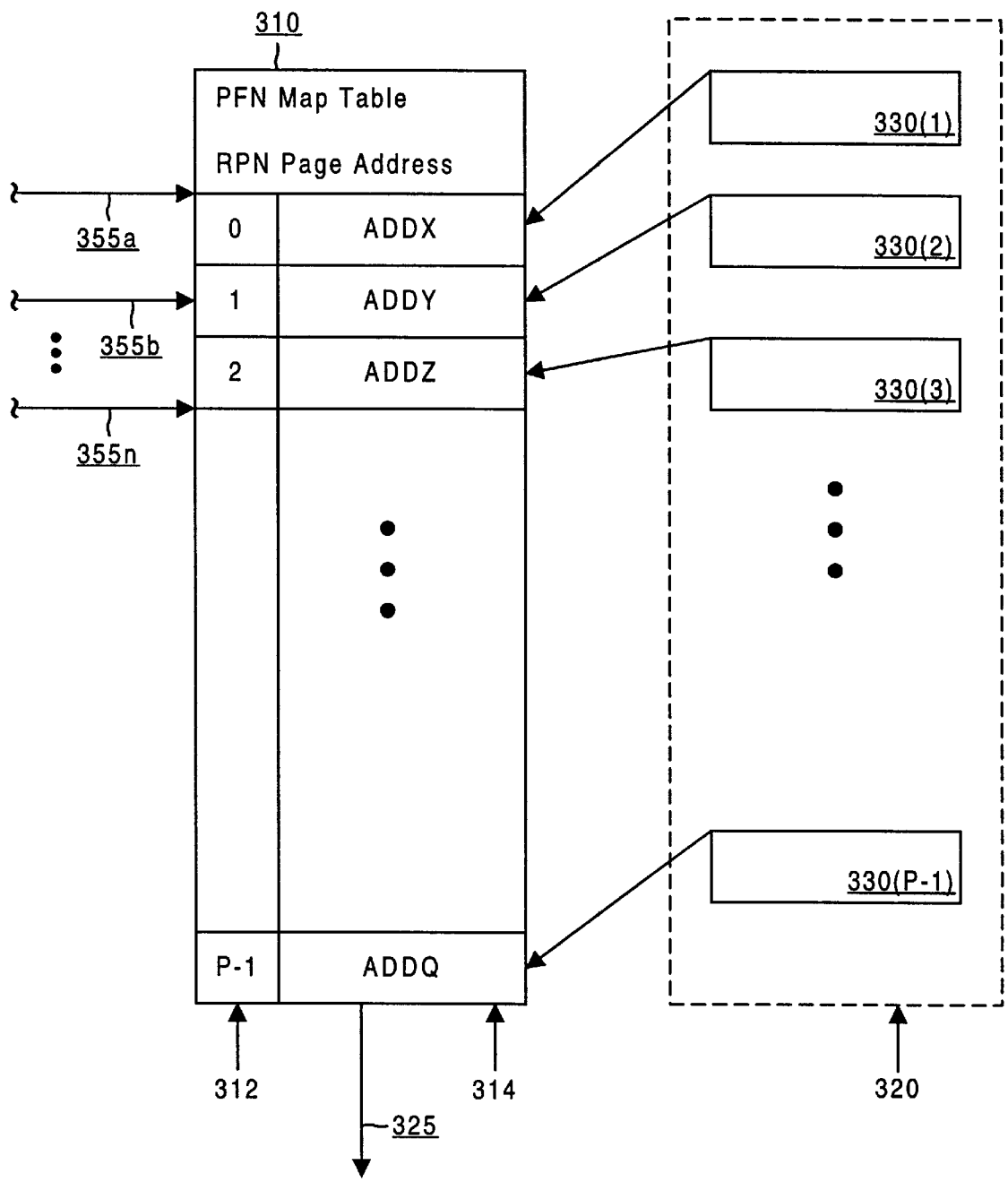
FIG. 3A illustrates a page frame number (PFN) map table data structure, and its mapping to physical memory, utilized within the present invention memory addressing system.
Figure 3B:
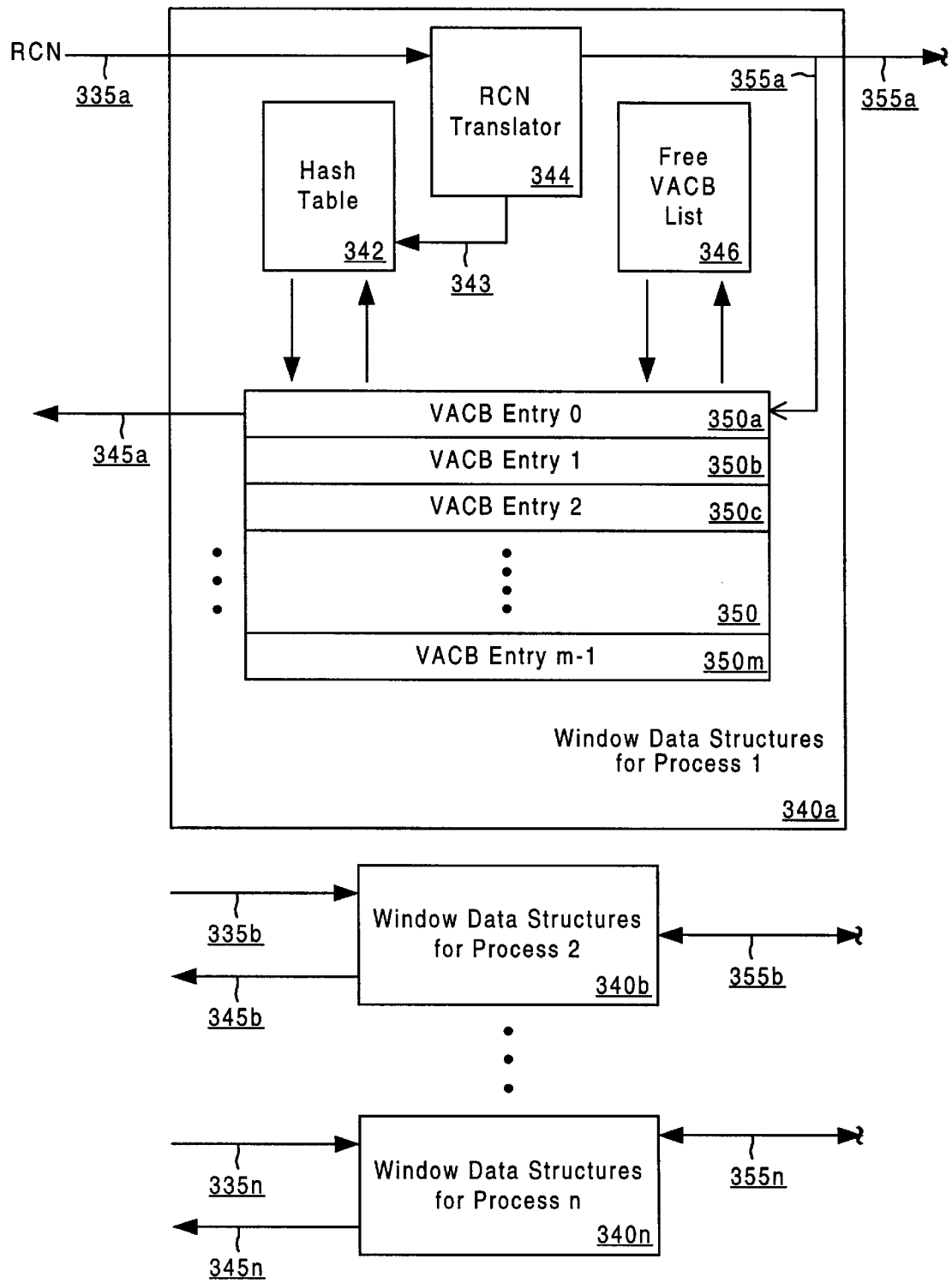
FIG. 3B illustrates data structures and interfaces of exemplary virtual windows utilized within the present invention for accessing physical memory.
Figure 3C:
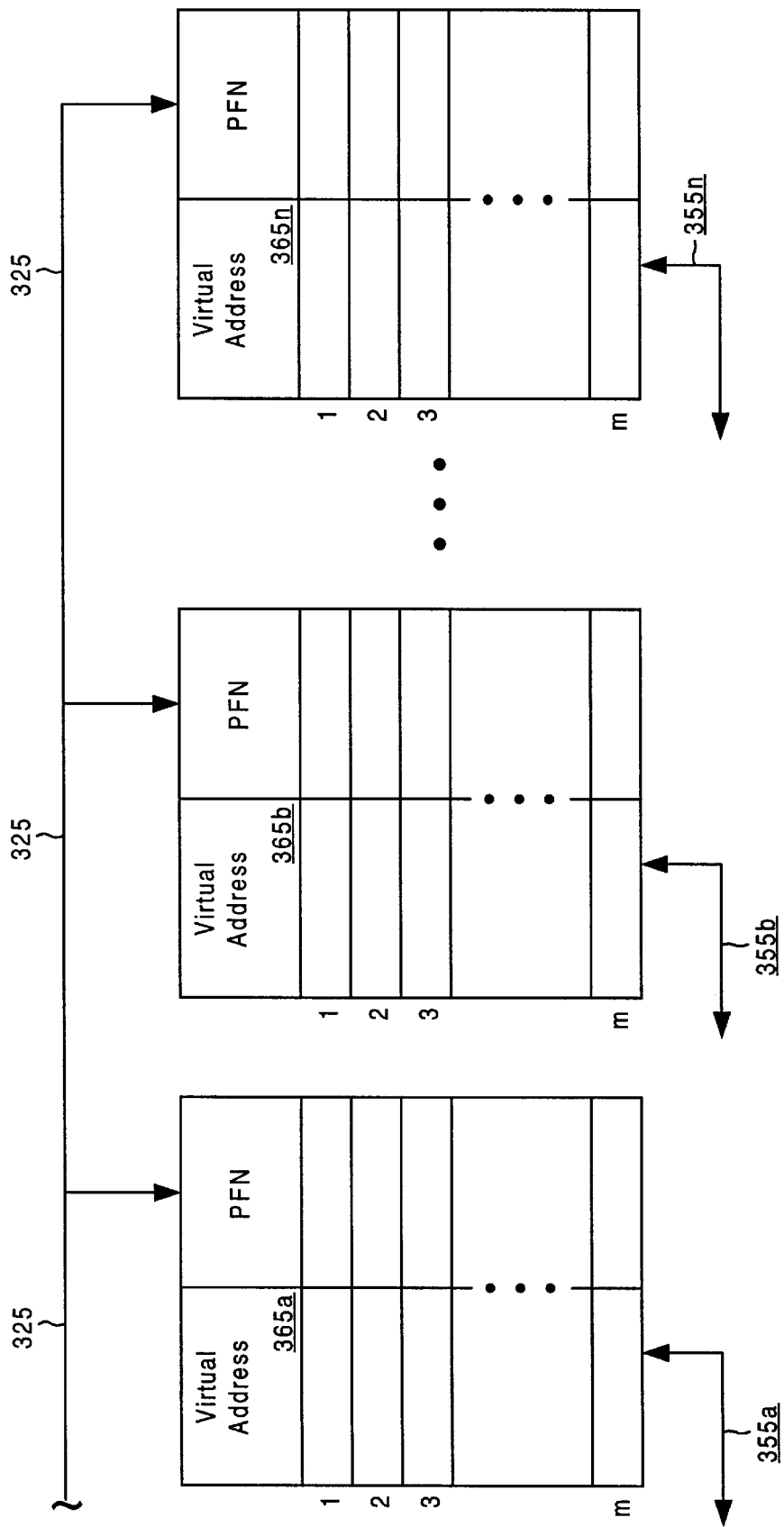
FIG. 3C illustrates an exemplary number of page table entry (PTE) data structures within the present invention addressing system.

With reference to FIG. 3A, FIG. 3B and FIG. 3C, the data structures of the physical memory centric addressing system of the present invention are described. It is appreciated that the memory space available to the operating system of computer system 112 is divided between "system address space" which is reserved for the operating system only and "process address space" which is available to each of the n possible processes executed on system 112. In a 32-bit operating system embodiment, 2 Gb is devoted to system address space while the remaining 2 Gb of the 4 Gb is available as process address space for the n processes. As discussed below, some data structures are maintained in system address space while others are maintained in process address space.

FIG. 3A illustrates a data structure stored in system memory called a page frame number table (PFN) 310 ("table 310"). Table 310 defines a very large physical buffer ("cache") 320 that exists within computer readable volatile memory unit 102 (FIG. 2). Physical buffer 320 is composed of P page groups numbered 330(1), 330(2), 330(3), . . . , 330(P). Each page group contains the number of pages of physical memory ("physical pages") that are necessary to store a database record object ("record"). In one embodiment of the present invention this number is one since the record size is smaller than the physical page size. Therefore, 330(1), 330(2), 330(3), . . . , 330(P) each represent one physical page. The order in which the above physical pages are arranged to form buffer 320 is defined by the sequential entries of table 310 which contain the addresses of these page groups.

The size of physical buffer 320, and the number of physical buffers allowed, is limited only by the availability of physical memory within 102. In a 32-bit addressable physical memory system, the maximum size of the physical memory cache 320 is 4 Gb. In a 64-bit addressable physical memory system, the maximum size of the physical memory cache 320 is (4 Gb * 4 Gb). The size, S, of each of the physical pages is programmable and within the present invention can be of a number of different sizes (e.g., 2 Kb, 4 Kb, 8 Kb, 16 Kb, 64 Kb, 128 Kb, etc.). In one embodiment of the present invention the page size is 8 Kb. In general, it is desired (but not necessary) to select a page size that is larger than the record size. For embodiments having a record size larger than the physical page size, multiple pages need to be accessed for each record. It is appreciated that the size of a virtual memory page is the same as the size of a physical memory page.

Table 310 of FIG. 3A contains P−1 entries, each entry contains: (1) a relative page number (RPN) associated with the record of the entry; and (2) an address to a physical page or addresses to the physical pages (e.g., in a page group) necessary to store the record associated with the entry. The RPN values of each entry are stored in column 312 and are ordered sequentially in one embodiment of the present invention. However, the physical page addresses stored in column 314 for each entry of table 310 do not necessarily need to be ordered sequentially; therefore the pages of physical memory used to construct buffer 320 can be sequential or discontiguous. An exemplary buffer construction is shown in FIG. 3A where buffer 320 is constructed of P physical pages with addresses Addx, Addy, Addz, . . . , and Addq (assuming an entire record fits within a single physical page). The physical pages are ordered according to their entry position within table 310. Although shown in ascending order, the pages associated with Addx, Addy, Addz, . . . , and Addq need not be ordered in physical memory 102. It is appreciated that a separate table 310 is required for each physical buffer (cache) 320 desired.

Within one embodiment of the present invention, the value P is selected to represent the number of records required within a particular set of database objects or within a known subset of database objects. For instance, if a database of telephone numbers is used, P might represent the number of individual listings (e.g., each listing contains a name, address, and telephone number) within the set, each listing being a different record. When records are loaded into table 310, they are loaded in record order from entry 0 to entry P−1.

Data paths 355a, 355b and 355n of FIG. 3A originate from virtual windows for processes 1, 2, . . . , to n and each provide an RPN value which is used as an index within the entries of table 310. Table 310 of the present invention then provides the physical page address(s) associated with the matching entry of the requested RPN; this information is provided over data path 325 to a set of page table entry (PTE) data structures (not shown, see FIG. 3C). It is appreciated that while there can be many virtual windows (described below) and many PTE data structures (described below), there is only one table 310 per physical buffer 320.

FIG. 3B illustrates the data structures of the virtual address space windows ("virtual windows") of the present invention. A virtual window is created for each process and provides the process with its own private address space. The virtual window is used by that process to map a record. Mapping the record into the process' virtual window allows the process access to that record's information. A database record is mapped for a particular process by assigning a virtual address to the record which allows the particular process to "see" the record. Each process of the n possible processes executing over system 112 can contain its own virtual window with which to access the information within physical buffer 320. Individual virtual window data structures can be shared between different processes, creating shared addressable virtual address space between the processes. Three exemplary virtual windows 340a, 340b, and 340n are illustrated in FIG. 3B for processes 1, 2, and n, respectively. Data structures within virtual window 340a are shown in detail, however, it is appreciated that each other virtual window (340b, . . . , 340n) contains analogous data structures. In one embodiment, the virtual window data structures of FIG. 3B are stored in process address space (as opposed to system address space) within computer system 112.

Virtual window 340a contains virtual address control block (VACB) table 350 which contains m entries (e.g., entry 350a, 350b, 350c, . . . , 350m). Each of the m entries is an individual VACB entry and contains: (1) an associated RPN number of the entry; (2) a virtual address associated with the RPN number; and (3) a pointer to the next sequential VACB entry. The virtual address values stored within table 350, within one embodiment of the present invention, are 32-bits in length. Within the entries of the VACB table 350, consecutive virtual addresses are spaced apart depending on the number of pages required to store a record. For instance, if the page length is 8 Kb (2000 hex), and the record size is less than one page, the virtual address values within entry 350a, 350b, 350c are 0, 2000, and 4000, respectively. It is appreciated that although a record can be smaller than a page size, the size of the virtual memory space per VACB entry is preferably set at whole page boundaries because whole virtual pages are mapped to whole physical pages within the present invention. For instance, in the case where a record is smaller than one page, the size of each virtual address space of a VACB entry is one page. If a record is larger than one page but smaller than two pages, the virtual memory reserved by each entry of table 350 is two pages. If a record is larger than two pages but smaller than three pages, the virtual memory reserved by each entry of table 350 is three pages, etc. Typically, many records can be assigned to a page.

The last entry within the VACB table 350 of FIG. 3B also contains an indication of the number of records that can be mapped within table 350 (e.g., m). The value m represents the maximum number of records that can be mapped by a particular process at any one time by the process's virtual window. The value m can be of any size within the present invention, but within some embodiments m is set between 100 and 300, with m=200 in one embodiment. The value of m is determined such that m number of mapped records provides a 90 percent hash hit ratio, where 90 percent or more access requests from a particular process result in a record that is currently mapped within the VACB table 350. At m=200, a 90 percent hash hit rate is typically reached in many database applications. At m=200 and a page size at 8 Kb, the size of the virtual window per process is approximately 1.6 or 2 Mb. If two pages are necessary to store a single record, the size of the virtual window per process is approximately 3.2 or 4 Mb. During mapping operations, virtual addresses originating from table 350 are output over data path 355a to the PTE table data structures (see FIG. 3C).

Virtual window 340a also contains a record number translator (RCN translator) unit 344 which receives a record number (RCN) over data path 335a and produces a relative page number (RPN) output over data path 355a. The RPN value represents the entry number within the PFN table 310 corresponding to the record number. The RPN value differs from the RCN value depending on the number of pages required to store a record, the number of records stored in a page, and if any entry number offset value is required. For instance, if c records are stored in a page, the RCN value is c times larger than the RPN value. However, if c pages are necessary to store a record, the RPN value is c times the RCN value. The RPN translator unit 344 also supplies the output RPN value over data path 343 to a hash table 342. Hash table 342 maintains a listing of all mapped records for its associated virtual window (virtual window 340a associated with process 1). During a record map operation, if the currently requested RPN happens to be already mapped, the hash table 342 generates an entry number into VACB table 350.

Virtual window 340a of FIG. 3B also contains a free VACB list 346 which is coupled to VACB table 350 and maintains a listing of all VACB entries within table 350 that are currently free (e.g., vacant) and can be used for current and future record mapping operations. VACB entries are placed in the free VACB list 346 as a result of a record unmap operation. The free VACB list 346 is coupled to the VACB table 350 with data paths as shown.

Each virtual window (e.g., 340a) also generates an output virtual address value over data path 345a back to its associated process (e.g., process 1) as a result of a record map operation. Therefore, during a record map operation, a record number (RCN) is input and virtual window 340a generates an output virtual address page value over data path 345a.

Virtual windows 340b, . . . , to 340n contain analogous data structures as described with reference to virtual window 340a. It is appreciated that the process address space required to maintain all of the data structures for a virtual window of size 200 records is approximately less than 8 Kb. This substantially reduced memory overhead is a direct result of the reduced virtual window size of the present invention compared to the prior art memory addressing mechanisms.

FIG. 3C illustrates three exemplary page table entry (PTE) data structures in accordance with the present invention. A PTE data structure is provided for and is binded to each process that has its own virtual memory address space (e.g., its own virtual window). However, individual PTE data structures can be binded to multiple different virtual windows creating shared memory space between the processes of those binded virtual windows. Three exemplary PTE data structures 365a, 365b and 365n are provided for exemplary processes 1, 2, and n, respectively. It is appreciated that within one embodiment of the present invention, the PTE data structures of the present invention are stored in the computer system's system address space where table 310 is also stored. Data path 325 originating from table 310 is coupled to communicate with each PTE data structure 365a, 365b and 365n. Physical page address values (PFNs) output from table 310 are communicated over data path 325. Data paths 355a, 355b and 355n are coupled, respectively, to PTE data structures 365a, 365b, and 365n to convey virtual addresses which originate from the process virtual windows 340a, 340b and 340n, respectively, during record mapping operations.

The PTE data structures 365a, 365b and 365n each contain a set of m entries, one entry for each of the m records capable of being mapped within the associated process virtual windows. Each entry contains: (1) a slot for a virtual address received from a virtual window; and also (2) a corresponding physical page address or addresses (from table 310) which are mapped to the entry. In the embodiment wherein a 32-bit operation system is utilized but a 64-bit physical memory is used, the virtual addresses within the PTE data structures are 32-bit but the physical addresses within the PTE data structures are 64-bit. During record access operations (e.g., read and write operations) the PTE data structures are accessed so that proper virtual address to physical address translations are performed.

It is appreciated that within the present invention, memory accesses to and maintenance of the data structures described above can be performed using the conventional memory addressing systems of the operating system.

OPERATION OF DATA STRUCTURES OF PRESENT INVENTION

In accordance with the present invention, the above data structures are used to allow each of the n processes access to the very large physical buffer 320 via a relatively small amount of virtual window space. Processes that require certain records from the physical buffer 320 map the physical pages that contain the records into their associated virtual address space using a MapRecord command. Since the physical buffer 320 is made large enough to contain a set of objects for the database, after the physical buffer 320 is initially loaded with the records associated with the set of objects, disk 104 I/O is no longer required to access information. Therefore, the present invention eliminates the disk I/O associated with the prior art "paging." At the completion of the database operation, the records of buffer 320 are then stored into disk 104.

Since the virtual address space of each process is limited, an UnmapRecord command is provided to free up entries of the VACB table 350 for a particular process. Freeing up VACB entries of table 350 frees up virtual address space within a process' virtual window. When an unmapped record needs to be mapped, the present invention performs mapping operations using freed or "vacant" virtual address space. Since the record mapping operations of the present invention do not require disk I/O, they operate at a rate of 20 microseconds per map (50,000 maps/sec). The mapping operation of the present invention is therefore significantly faster than the disk I/O delay (e.g., 30 accesses per second) associated with the prior art paging operations. The faster mapping speed of the physical memory centric system of the present invention gives rise to a significant performance advantage over the prior art virtual memory centric memory addressing system.

Specifically, the present invention supports the following commands within the physical memory centric memory addressing system. The first command, CreatePhysical-Buffer (records, recordsize, bname), creates the physical buffer 320 by generating table 310. The records argument specifies the number of records, P, that are to be reserved within table 310. The recordsize argument indicates the size of each record, and depending on the currently selected page size, determines the number of pages required to store a record (or the number of records that can be stored within a page). If the page size, S, is larger than the recordsize argument, each entry within table 310 indicates a single page. If the recordsize argument is larger than the current page size, S, then each entry within table 310 includes more than one page address to indicate a page group which is used to contain each record. The bname (buffer name) argument specifies the name of the physical buffer 320 since more than one physical buffer 320 can be implemented at any given time. The command, DeletePhysicalBuffer (bname), is used to eliminate the physical buffer 320 indicated by the argument, bname, to free up physical memory. The table 310 associated with the deleted physical buffer is also eliminated from the system address space.

The command, CreateWindow (bname, records, wname), creates a virtual window (e.g., data structures of FIG. 3B) for the calling process (e.g., process i) and names the created window according to the wname (virtual window name) argument. This command also allocates a set of m record slots to the virtual window's VACB table 350 as indicated by the records argument. The created virtual window, wname, is then binded to the physical buffer 320 indicated by the argument, bname. A process can have multiple virtual windows created at the same time with different names each and binded to different physical buffers. The command, DeleteWindow (wname) is used to eliminate the virtual window data structures indicated by the argument, wname, for the calling process (e.g., process i) to free up process address space within computer system 112.

The command MapRecord (record#, wname, *address) maps a record, indicated by the argument, record#, for a particular process (e.g., process i) within its virtual window indicated by the wname argument. The command returns a virtual address pointer value (*address), within the virtual window identified by the wname argument, with which the process i can use to access the record (indicated by record#); the record information is stored in the physical memory buffer 320 that is binded to the wname virtual window. The command, UnmapRecord (*address) is used to unmap a record stored at the virtual address indicated by the *address argument for the calling process (e.g., process i). A window name is not required since the virtual address indicated by the *address argument is unique for the calling process (e.g., process i).

The flow diagrams of FIG. 4 to FIG. 8 indicate the steps performed by the computer system 112 in accordance with the present invention, in relation to the data structures described above, to implement the following commands: (1) CreatePhysicalBuffer; (2) CreateWindow; (3) MapRecord; (4) perform an access of the physical memory; and (5) UnmapRecord.

Figure 4:
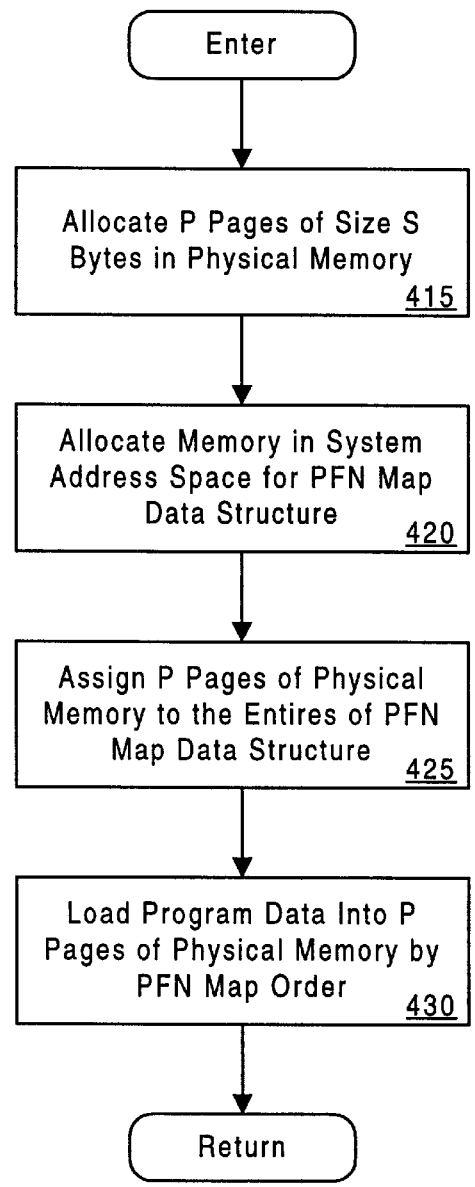
FIG. 4 is a flow diagram illustrating steps of the present invention addressing system for allocating/generating a very large sized physical buffer according to the PFN map table data structure.

FIG. 4 illustrates steps within process 410 performed by the computer system 112 to implement the CreatePhysical-Buffer command of the present invention. Process 410 is implemented as steps or instructions stored within computer readable memory units of computer system 112 and executed by a processor of processor(s) 101. Process 410 commences at step 415 in response to a command syntax shown below:

CreatePhysicalBuffer (records, recordsize, bname)

At step 415, the computer system 112 is instructed to allocate P pages (or page groups) of physical memory to form physical buffer 320, wherein each page size is S bytes long. In one embodiment, the size of a page is 8 Kb but the present invention is well suited for pages of many different sizes (e.g., 16 Kb, 64 Kb, etc.). The value P is the number of records specified in the records argument. The recordsize argument specifies the number of bytes within a record. If the recordsize is larger than a page of memory, multiple pages (e.g., a page group) are required to store a single record and these additional pages are reflected in the resultant value of P. The physical buffer 320 generated by step 415 is given the name indicated by the bname argument. Within a 32-bit physical memory addressable system, the maximum size of buffer 320 is 4 Gb. However, within a 64-bit physical memory addressable system, the maximum size of physical buffer 320 is (4 Gb * 4 Gb). It is appreciated that within a computer system 112 having a 32-bit operating system, but having a 64-bit addressable physical memory space, the maximum allowed size of the present invention physical buffer 320 is (4 Gb * 4 Gb). This is the case because the size of buffer 320 within the present invention is limited only by the addressability of the physical memory 102 within system 112.

At step 420 of FIG. 4, the present invention allocates a portion of memory within the system address space for the PFN table 310 of FIG. 3A for the bname buffer 320. At step 425, the present invention assigns P pages of free physical memory to the entries of the PFN table 310 associated with the bname buffer 320. At step 425, the addresses of the physical pages that are assigned to the entries of the bname buffer 320 are recorded in the appropriate entries of PFN table 310. Within consecutive entries of PFN table 310, the addresses of the physical pages do not necessarily need to be in an ascending or descending order or even consecutive; the addresses can be unordered and sequential pages can be discontiguous within physical memory 102.

At step 430 of process 410 of FIG. 4, the present invention then loads a set of database objects (e.g., a series of individual records) into the P pages of physical memory defined by the PFN table 310 which correspond to the bname buffer 320. In this way, the bname buffer 320 is filled with sequential database records. The above records are loaded into the physical pages according to their page order as defined by the PFN table 310. In other words, at step 430, the physical page(s) associated with entry 0 of table 310 are loaded first, the physical page(s) associated with entry 1 are loaded second, etc. and the physical page(s) associated with the last entry of table 310 are loaded last. During record loading, the proper PFN numbers are loaded into each entry of table 310 so that the records can be subsequently accessed.

At the completion of process 410, a physical buffer 320 called bname is generated within physical memory and a corresponding PFN table 310 is generated within system addressable memory. Process 410 is repeated for each physical buffer 320 that is required.

Figure 5:
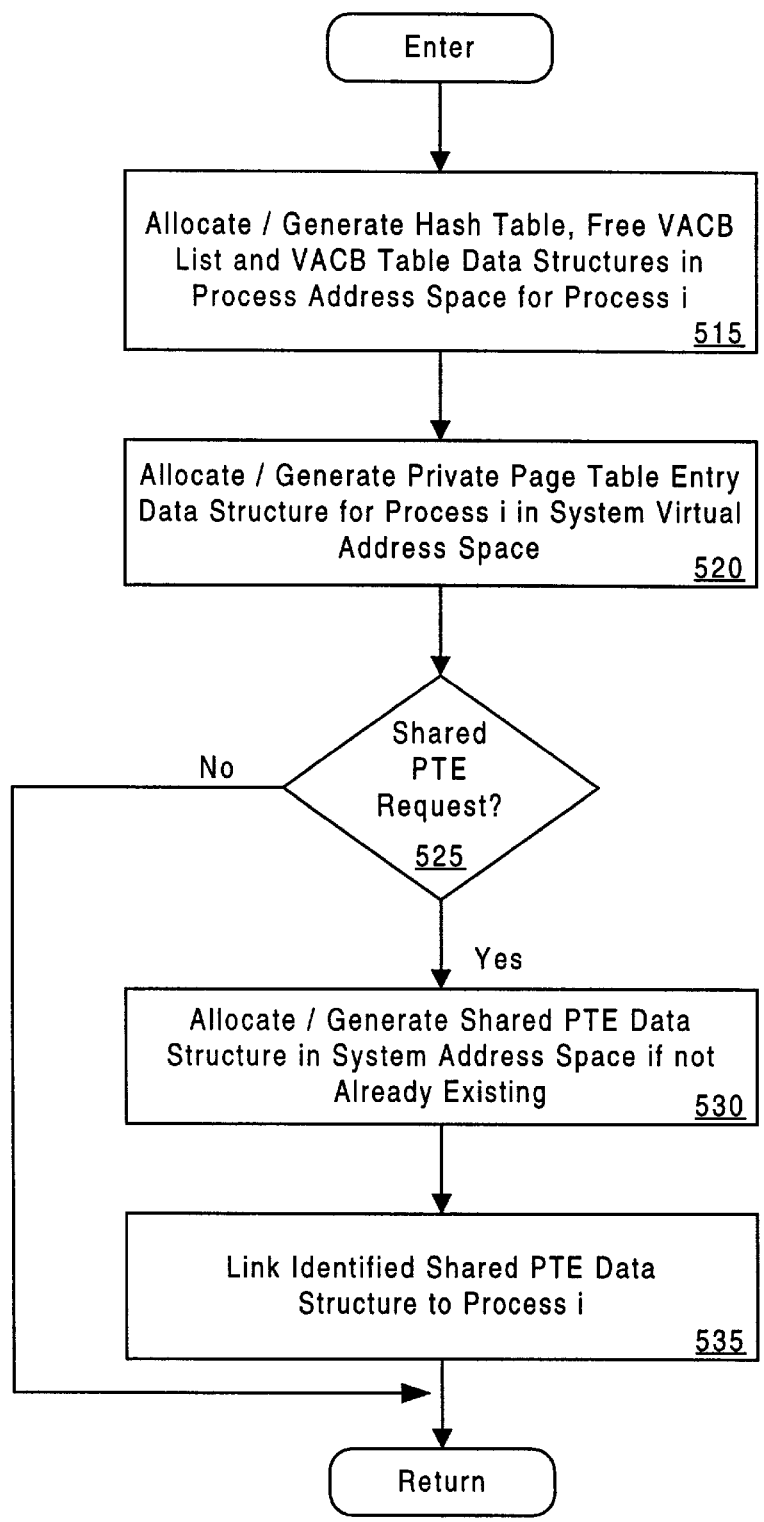
FIG. 5 is a flow diagram illustrating steps of the present invention addressing system for allocating/generating data structures required to generate a virtual window for a particular process.

FIG. 5 illustrates steps within process 510 performed by the computer system 112 to implement the CreateWindow command of the present invention. Process 510 is implemented as steps or instructions stored within computer readable memory units of computer system 112 and executed over a processor of processor(s) 101. Process 510 commences at step 515 in response to a particular process (e.g., process i) using a command syntax shown below:

CreateWindow(bname, records, wname)

At step 515, the present invention allocates memory within the process address space of system 112 for the virtual window data structures for virtual window wname. At step 515, the hash table 342, the free VACB list 346 and the VACB table 350 (FIG. 3B) are generated for process i. The free VACB list 346 is initialized so that all m entries within VACB table 350 are marked as free. The VACB table 350 is initialized such that each sequential entry commences with a virtual address value that is spaced apart from its prior entry by as many pages as are required to store a record. In the case where the record size is smaller than the page size, the virtual addresses within the entries of the VACB table 350 are spaced apart by one page in size, starting with an arbitrary first address value (e.g., zero). Each VACB entry within table 350 also contains a pointer to the address of the next VACB entry.

The virtual window data structures generated at step 515 are pertinent to a virtual window called wname for process i (process i can have several virtual windows allocated simultaneously, but typically only one virtual window is required). The argument, records, indicates the number of records, m, to be allocated for the VACB table 350. This value represents the number of records that can be mapped to physical address space within the virtual window indicated by wname. At step 515, the present invention also binds the generated virtual window, wname, of process i to the physical buffer indicated by bname. If bname does not exist, then it is either generated (see FIG. 4) or an error message is generated at step 515 indicating that the specified physical buffer bname does not exist.

At step 520 of FIG. 5, system memory space is allocated for the PTE data structure (e.g., 365*a*) for process i and the PTE data structure is generated. The generated PTE data structure is then linked to the physical buffer 320 indicated by bname. Step 525 is reserved for PTE data structures that are to be shared between multiple virtual windows so that multiple processes can utilize the same virtual-physical memory space mapping. At step 525, if a shared PTE is requested (e.g., by a custom argument within the CreateWindow command that specifies a particular PTE), then processing flows to step 530, if not then process 510 returns.

At step 530, the present invention allocates system memory space for the shared PTE data structure and generates the structure assuming it does not already exist. At step 535, the present invention then links the shared PTE structure indicated above with process i through the virtual window indicated by wname. In this way, the virtual address range of virtual window, wname, can be shared by any other process that is binded to the same PTE data structure. It is appreciated that steps 525, 530 and 535 are optional within the scope of the present invention.

Figure 6A:
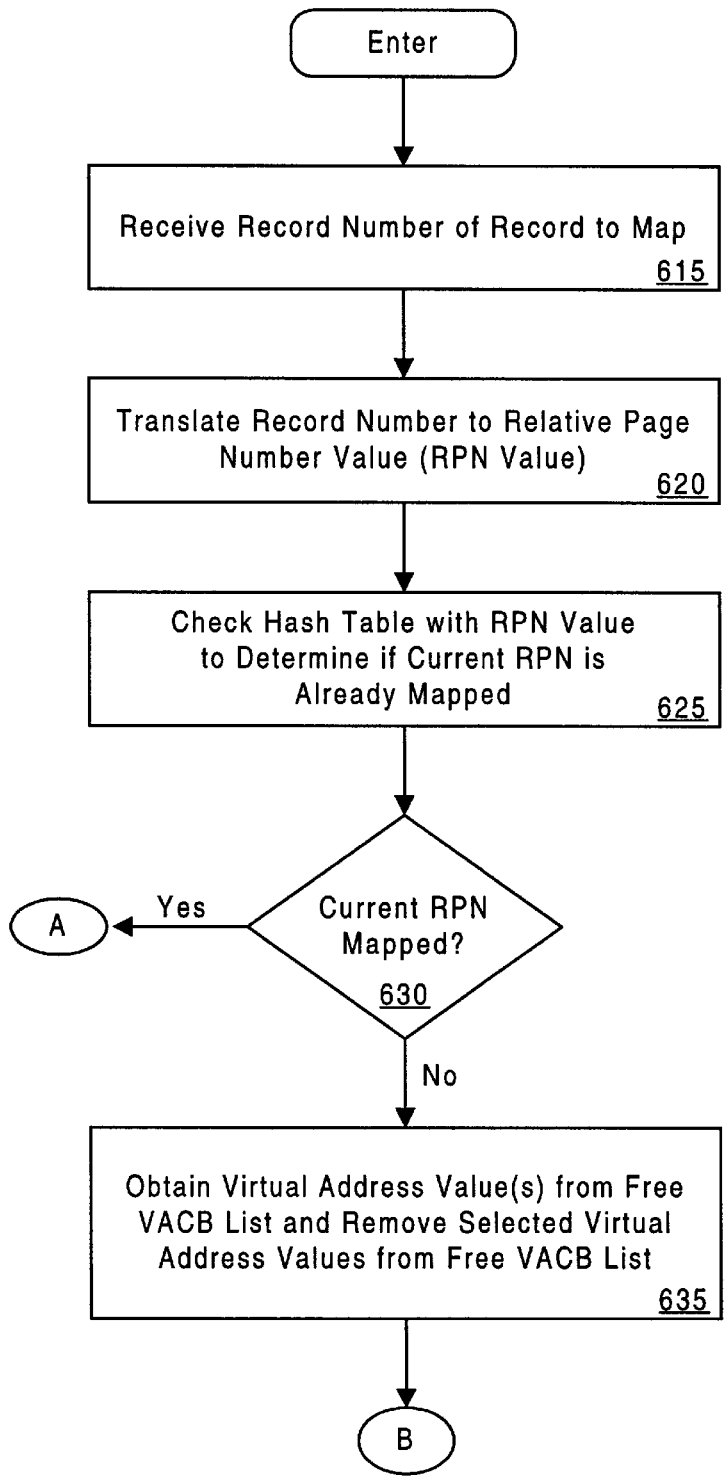
FIG. 6A and FIG. 6B represent a flow diagram illustrating steps of the present invention addressing system for mapping a particular record within a particular process in accordance with the present invention addressing system
Figure 6B:
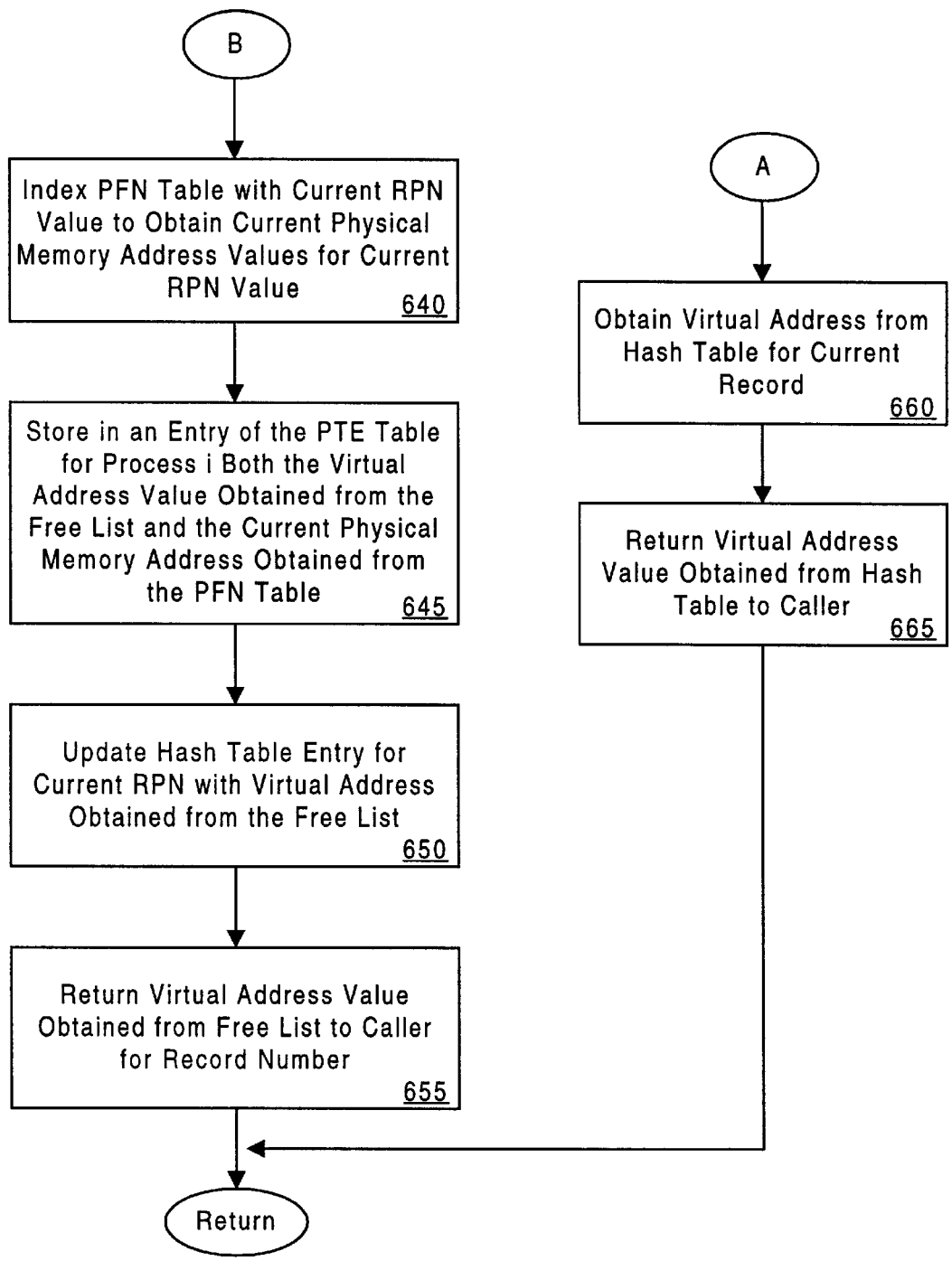

FIG. 6A and FIG. 6B illustrate steps within process 610 performed by the computer system 112 to implement the MapRecord command of the present invention. Process 610 is implemented as steps or instructions stored within computer readable memory units of computer system 112 and executed over a processor of processor(s) 101. Process 610 commences at step 615 in response to a particular process (e.g., process i) using a command syntax shown below:

MapRecord(record#, wname, *address)

The argument, wname, indicates the virtual window that is associated with process i into which a record is to be mapped. At step 615 of FIG. 6A, the present invention reads the record number to map from the record# argument. At step 620, the present invention utilizes the RCN translator unit 344 of the wname virtual window to translate the record# (RCN) value to a relative page number (RPN) value which is used to index the buffer 320 that is linked to the wname virtual window. The translation process can add an offset value to the RCN and can also compensate for instances where multiple pages are required to store a complete record or where multiple records are stored within a single page. At the completion of step 620, the present invention generates a RPN value which indicates the entry number within table 310 which contains the page address where the data for the record (RCN) resides. Table 310 is associated with the physical buffer 320 linked to the wname virtual window. If multiple physical buffers exist and it is unclear which physical buffer is binded to wname, an error message is generated.

At step 625, the present invention forwards the RPN value to the hash table 342 of wname to check if the current RPN is already mapped within wname. At step 630, if the current RPN is not mapped, then processing flows to step 635, otherwise processing flows to step 660 of FIG. 6B.

At step 635 of FIG. 6A, the present invention examines the free VACB list 346 of wname and obtains a free entry number within the VACB table 350. If no VACB entries are free, an error message is generated stating that wname is full and no further records can be mapped. If a free VACB entry exists, the present invention then obtains the virtual address associated with this free entry number and records the current RPN within this VACB entry. The present invention then removes the above selected VACB entry from the free VACB list 346.

At step 640 of FIG. 6B the present invention indexes the PFN table 310 that is linked to wname with the RPN value determined at step 620. This obtains the starting address of the physical page(s) that contains the current record which is to be mapped. At step 645, the address obtained at step 640 is then transferred over data path 325 to the PTE table (e.g., 365a) linked to wname. Also transferred to the same PTE table via data path 355a is the virtual address obtained by step 635. Both of these values are stored within a free PTE table entry of the PTE table linked to wname. In the instance where multiple pages are required to store a record, multiple page addresses are stored within the PTE entry associated with the record and multiple virtual addresses are also stored within this PTE entry.

At step 650 of FIG. 6B, the present invention updates the hash table 342 of wname to indicate that the current RPN is mapped within the PTE table linked to wname. At step 650, the entry number of the VACB table 350 of the current record is stored in an entry of the hash table 342 unique to the current RPN value. At step 655, the present invention returns the virtual address value obtained from step 635 using the pointer argument *address to process i. This virtual address value is then used by process i in order to access the data within the indicated record. Process 610 then returns.

At step 660 of FIG. 6B, the hash table 342 of wname indicates that the current RPN is already mapped. In this case, the present invention inputs the current RPN into the hash table 342 to obtain the entry number of the VACB table 350 of wname corresponding to the current RPN. At step 660, the present invention reads this entry number of the VACB table 350 of wname to obtain the mapped virtual address corresponding to RPN. At step 665, the present invention returns the virtual address value obtained from step 660 using the argument, *address. This virtual address value is then used by process i in order to access the data within the indicated record. Process 610 then returns.

At the completion of process 610, the present invention effectively maps the selected record (record#) into the virtual address space associated with the particular process (process i). A record remains validly mapped until the record is unmapped. It is appreciated that although the physical memory space can be 64-bit addressable, the virtual addresses used in process 610 can advantageously be 32-bit due to the relatively small size of the virtual windows of the present invention.

The mapping procedures of process 610 offer a significant performance advantage over the prior art addressing system. The measured time required to map a record (that is not already mapped) into a virtual window is approximately 20 microseconds (50,000 maps per processor 101). In a system having eight processors 101, approximately 400,000 maps can be performed per second. Further, it has been experienced that a virtual window of approximately 200 records in size (e.g., m=200) results in a hash table hit rate of approximately 90 percent. In other words steps 660–665 of FIG. 6B are executed in 90 percent of the mapping requests. The measured time required to perform a map hit operation (e.g., hash hit) is approximately 500 nanoseconds. In an experiment wherein 10,000 transactions per second were performed (for a 10K TPC-C load on an 8 CPU 300 MHz TurboLaser configuration DEC Alpha), 3500 maps per second were requested with less than 10 percent seeing a hash table miss and over 90 percent experiencing a hash hit. Therefore, 300 maps were required at 20 microseconds each, yielding 6 milliseconds devoted to mapping and 3200 map hits consuming 1.6 milliseconds. The mapping operations required only 1/1000 of the CPU time to support. Since the physical buffer 320 contains an entire set of database objects, no disk I/O operations are required during the above mapping.

Figure 7:
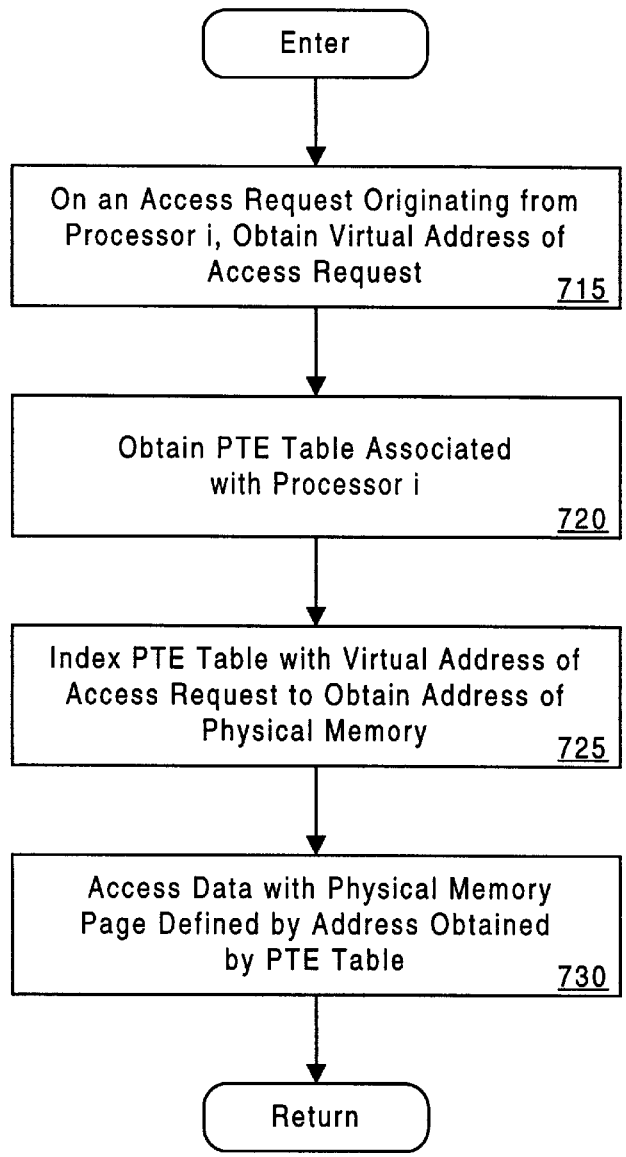
FIG. 7 is a flow diagram illustrating steps of the present invention addressing system for accessing physical memory (e.g., with read and write operations) based on the data structures of a process' window and its page table entry.

FIG. 7 illustrates steps within process 710 performed within the computer system 112 to access physical memory buffer 320 via a virtual window associated with a particular process (e.g., process i). Process 710 is implemented as steps or instructions stored within computer readable memory units of computer system 112 and executed over a processor of processor(s) 101. Process 710 is invoked by process i invoking a read or a write command from or to an address within its virtual address space that has been mapped to a record. At step 715, the computer system 112 receives an access request (e.g., read or write) from process i and obtains the virtual address of the access request.

At step 720 of FIG. 7, the present invention obtains the PTE table (e.g., PTE table 365a) associated with process i. At step 725, the present invention indexes the selected PTE table with the virtual address obtained at step 715 and obtains the physical page address stored within the indexed PTE entry corresponding to the physical page containing the record. At step 730, the present invention accesses the data stored within the physical page identified by the physical page address obtained at step 725 and performs the required virtual address access request; this request can be a read or a write of the information stored at the mapped physical address location. At step 730, the virtual address can be an offset address within the selected physical page address determined from step 725. Process 710 then returns.

Figure 8:
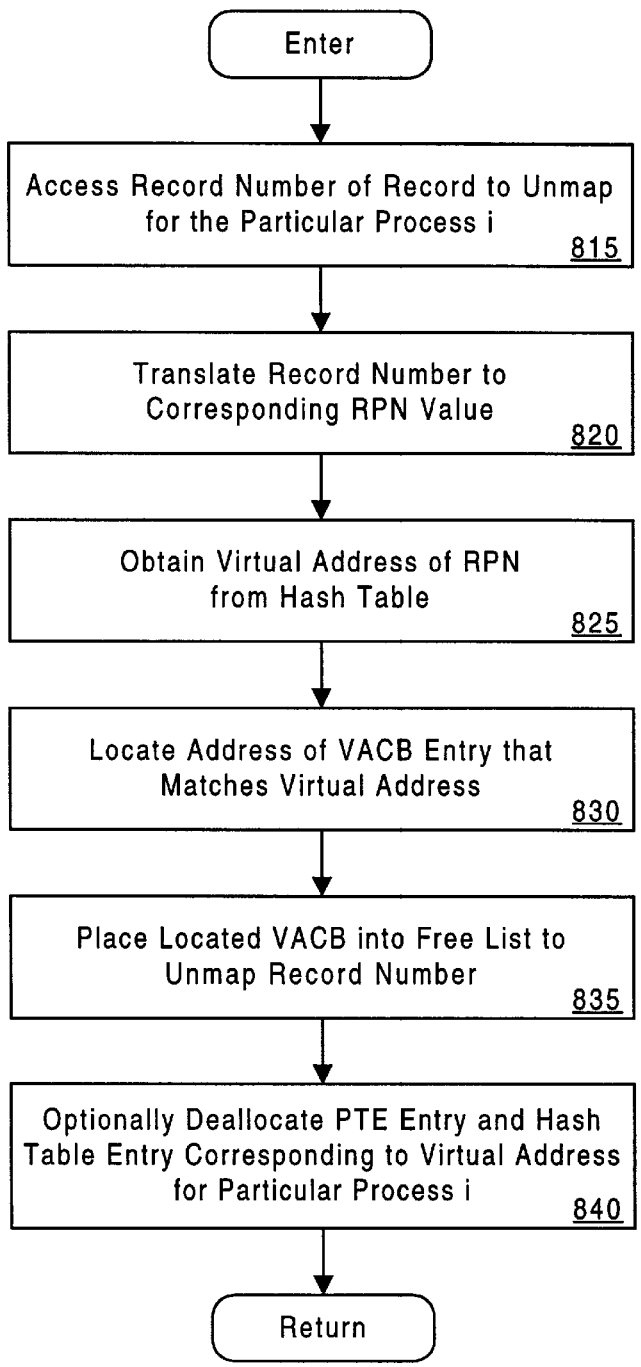
FIG. 8 is a flow diagram illustrating steps of the present invention for unmapping a record within a particular virtual window.

FIG. 8 illustrates steps within process 810 performed by the computer system 112 to implement the UnmapRecord command of the present invention. Process 810 is implemented as steps or instructions stored within computer readable memory units of computer system 112 and executed by a processor of processor(s) 101. Process 810 commences at step 815 in response to a particular process (e.g., process i) using a command syntax shown below:

UnmapRecord (*address)

At step 815 the present invention obtains the virtual address of the record to unmap from the pointer argument, *address. Since the entries of the VACB table 350 contain both the virtual address and their associated RPN values, at step 815, the RPN value associated with the input *address pointer can be obtained from the VACB table 350 associated with process i. Alternatively, step 815 can also be given the record number directly (e.g., the RCN) in which case the present invention at step 820 utilizes the RCN translator unit 344 of process i's virtual window to translate the record number to the appropriate RPN value. In the alternative case, where the record number is given directly to process 810, step 825 is required to obtain the virtual address of the RPN value using process i's virtual window hash table 342. In either of the alternative embodiments described above, at process 830, the virtual address of the record to unmap is known.

At process 830, the present invention locates the entry within process i's virtual window VACB table 350 that contains the virtual address to unmap. This VACB table entry is then placed into the free VACB list 346, at step 835, so that subsequent record mapping operations can make use of the free VACB entry. Within the preferred embodiment of the present invention, no other deallocation is performed so that subsequent mapping operations of this same record will register a hash table hit up until the moment that the free VACB entry is actually used by another record mapping operation (and the hash table 342 is then altered). This unmap optimization improves data access performance. Process 810 then returns.

Optionally, at step 840, the PTE entry associated with the unmapped record is located and deallocated and the entry within the hash table 342 associated with the unmapped record is deallocated for process i. Process 810 then returns under this embodiment.

CONCLUSION

Figure 9:
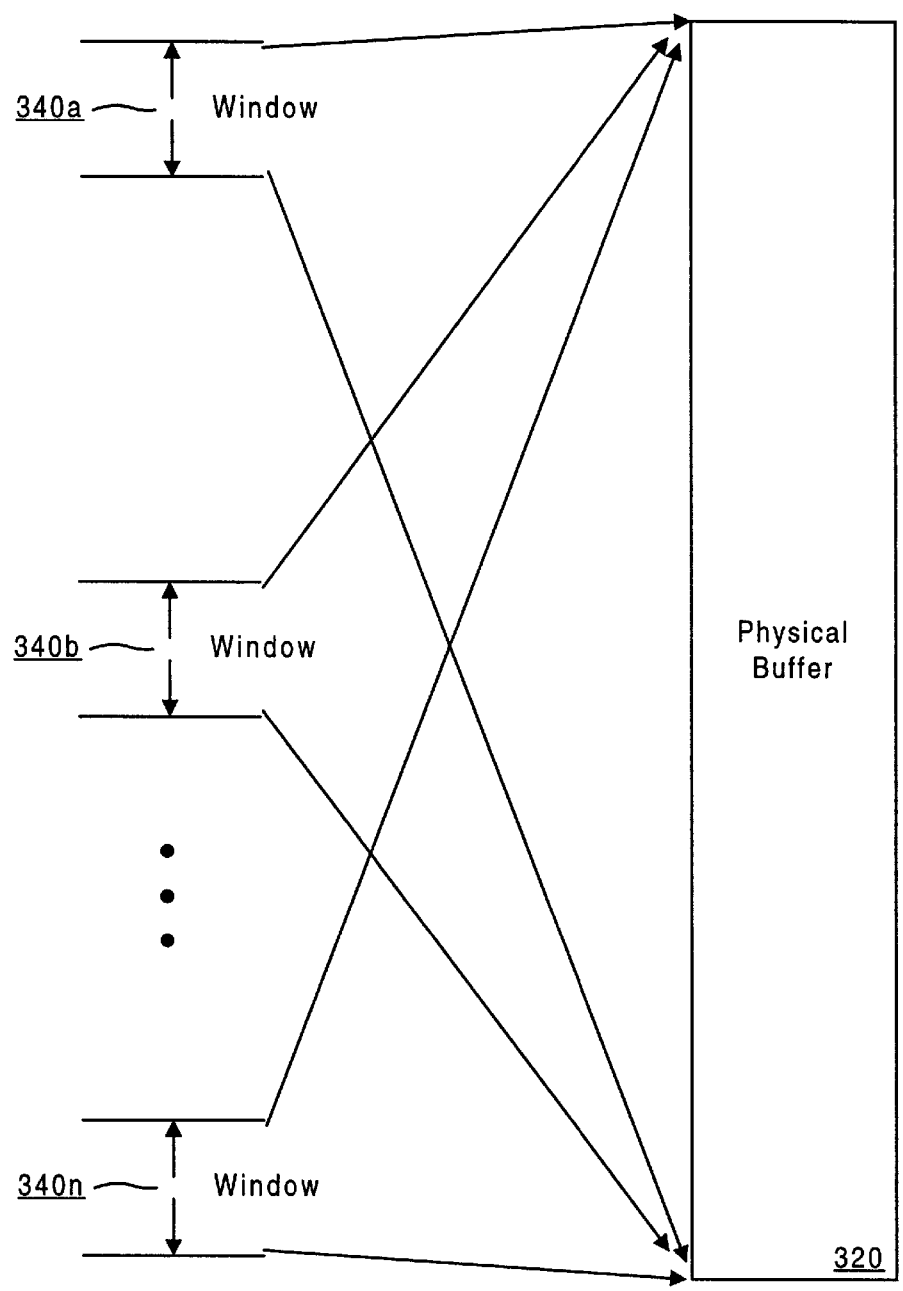
FIG. 9 is a logical diagram illustrating exemplary virtual windows mapped to the physical memory buffer within the addressing system of the present invention.

FIG. 9 is a logical diagram illustrating exemplary virtual windows mapped to the physical memory buffer within the addressing system of the present invention. As shown, virtual windows 340a, 340b and 340n for processes 1, 2, and n, respectively, each can map to and have access to the entire physical buffer 320. However, only a small amount of the physical buffer 320 can be mapped to a virtual window at any given time. Each process has only a relatively small amount of virtual memory within its virtual window (e.g., approximately 2 Mb) with which to access the information of the physical memory buffer 320. As more informations (e.g., records) are required within a virtual window, they are mapped from the physical buffer into the virtual window. Since the mapping operations of the present invention do not require disk I/O (as the paging operations of the prior art require) they occur very rapidly providing a performance advantage over the prior art.

Using the addressing scheme of the present invention, a particular process (e.g., process i) within a 32-bit operation system, can have access to a physical memory buffer size larger than 4 Gb which is an advantage not possible with the prior art. In one embodiment where the physical memory is 64-bit addressable, process i can have access to as much as 4 Gb * 4 Gb physical memory although operating within a 32-bit operating system.

By maintaining the record size (e.g., m) within the virtual address space of each of the n processes relatively small (e.g., 2 Mb each), the present invention advantageously reduces the system memory overhead required to maintain the data structures that perform the virtual to physical memory space mapping. In one instance, the system memory space overhead required to maintain the above data structures is less than one page (e.g., 8 Kb) of memory per process. With 500 processes running simultaneously, the memory overhead to maintain the mapping data structures is less than 4 Mb as compared to the 2 Gb required of the prior art addressing systems. Therefore, the present invention offers a significant memory overhead advantage even for operating systems that are 64-bit.

Further, by completely loading the physical buffer 320 with a set of objects for a particular database application, subsequent disk I/O operations are eliminated until the completion of the database processing when the new data is then stored back to disk 104. Importantly, no disk I/O activity is required during the record mapping operations of the present invention thus significantly increasing application performance. Also, the present invention is able to provide a large amount of physical memory addressing space to a particular process by eliminating the working set size limitations of the prior art. For instance, within a computer system having a 32-bit operation system but a 64-bit addressable physical memory, the present invention is well suited to provide a physical address buffer of 7 Gb to share across the n processes.

Also, since the present invention bypasses the conventional addressing system of prior art operating systems and replaces the addressing system with the mechanisms described above, the present invention can readily be added to an existing 16-bit and 32-bit operating system to allow processes access to very large physical buffers (e.g., larger than 4 Gb) without needing to substantially redesign the 16-bit and 32-bit operating systems. Moreover, minimal operating system and application modifications need be made within an implementation of the present invention because the operation systems and applications can retain their 16-bit or 32-bit pointers while accessing the physical buffer 320.

The preferred embodiment of the present invention, a physical memory centric addressing system and method, are thus described. While the present invention has been described in particular embodiments, it should be appreciated that the present invention should not be construed as limited by such embodiments, but rather construed according to the below claims.

What is claimed is:

1. In a computer system having a processor coupled to a bus and a memory coupled to said bus, an addressing system for providing a process with access to a large physical memory space, said addressing system comprising:

(a) a first table comprising a plurality of entries, each entry corresponding to a page of said physical memory space, said first table stored in said memory;

(b) a virtual window associated with said process and representing a relatively small amount of virtual address space compared to said physical memory space, said virtual window comprising a control block table stored in said memory, said control block table comprising a plurality of control block entries, each control block entry representing a page of virtual memory within said virtual window; and (c) a page table entry data structure stored in said memory and corresponding to said process, said page table entry data structure comprising a plurality of entries, each entry for mapping a page of virtual memory of said process to a page of said physical memory space, wherein data records of said physical memory space are mapped into said virtual window of said process by associating, within said entries of said page table entry data structure, physical page addresses of said data records with vacant virtual page addresses of said virtual window.

2. An addressing system as described in claim 1 wherein said process operates within a 32-bit operating system of said computer system and said large physical memory space is 64-bit addressable.

3. An addressing system as described in claim 1 wherein said process operates within a 64-bit operating system of said computer system and said large physical memory space is 64-bit addressable.

4. An addressing system as described in claim 1 wherein said large physical memory space is equal to or larger than 4 Gb in size and wherein said virtual address space is approximately on the order of between 1 and 2 Mb in size.

5. An addressing system as described in claim 1 wherein said virtual window further comprises:
   a control block free list indicating vacant entries within said control block table; and
   a hash table for maintaining a list of records mapped within said virtual window and their corresponding mapped entry within said control block table.

6. An addressing system as described in claim 5 wherein said virtual window further comprises a record number translator unit for translating record numbers into relative page numbers which represent entries within said first table.

7. An addressing system as described in claim 1 wherein each entry of said control block table represents a page of virtual address space within said virtual window for mapping a data record stored within said physical address space.

8. In a computer system having a processor coupled to a bus and a memory coupled to said bus, an addressing system for providing a plurality of processes with access to a large physical memory space of said memory, said addressing system comprising:
   (a) a first table comprising a plurality of entries, each entry corresponding to a page of said physical memory space;
   (b) a plurality of virtual windows each associated with a particular process of said plurality of processes and each representing a relatively small amount of virtual address space in relation to said physical memory space, each of said virtual windows comprising:
      (1) a control block table comprising a plurality of control block entries, each control block entry representing a page of virtual memory within said virtual window; and
      (2) a control block free list indicating vacant entries within said control block table; and
   (c) a plurality of page table entry data structures each associated with a particular process of said plurality of processes, each of said page table entry data structures comprising a plurality of entries, each entry for mapping a particular page of virtual memory of said page table entry data structure's particular process to a page of said physical memory space, and
   wherein data records of said physical memory space are mapped into said virtual windows of said process by associating, within said entries of said page table entry data structures, physical page addresses of said data records with vacant virtual page addresses of said virtual windows.

9. An addressing system as described in claim 8 wherein said process operates within a 32-bit operating system of said computer system and said large physical memory space is 64-bit addressable.

10. An addressing system as described in claim 8 wherein said process operates within a 64-bit operating system of said computer system and said large physical memory space is 64-bit addressable.

11. An addressing system as described in claim 8 wherein said large physical memory space is equal to or larger than 4 Gb in size and wherein said virtual address is approximately on the order of between 8 and 2 Mb in size.

12. An addressing system as described in claim 8 wherein each of said virtual windows further comprises a hash table for maintaining a list of records mapped within said virtual window and their corresponding mapped entry within said control block table.

13. An addressing system as described in claim 12 wherein each of said virtual windows further comprises a record number translator unit for translating record numbers into relative page numbers which represent entries within said first table.

14. An addressing system as described in claim 8 wherein each entry of said control block table of each virtual window represents a page of virtual address space within its associated virtual window for mapping a data record stored within said physical address space.

15. In a computer system having a processor coupled to a bus, a disk coupled to said bus, and a physical memory coupled to said bus, an addressing method for providing access of a very large physical memory space to a plurality of processes, said addressing method comprising the computer implemented steps of:
   generating a page table having a plurality of entries, each entry corresponding to at least one page within said large physical memory space, said plurality of entries defining a physical buffer;
   loading a set data records associated with a database application into said physical buffer;
   generating a plurality of virtual windows within said computer system, each of said virtual windows associated with a process of said plurality of n processes, each of said virtual windows providing its associated process with a virtual address space with which said associated process can access said physical buffer, said virtual address space being substantially smaller than said physical buffer; and
   mapping a particular data record of said physical buffer into a virtual address space associated with a particular virtual window of said plurality of virtual windows, said step of mapping providing a particular process associated with said particular virtual window with access to said data record within said physical buffer.

16. An addressing method as described in claim 15 further comprising the step of unmapping a particular mapped data record of said physical buffer from said virtual address space associated with said particular virtual window, said step of unmapping freeing an amount of virtual address space available to said particular process associated with said particular virtual window.

17. An addressing method as described in claim 15 wherein said plurality of processes operate within a 32-bit operating system of said computer system and said large physical memory space is 64-bit addressable.

18. An addressing method as described in claim 15 wherein said physical buffer is equal to or larger than 4 Gb in size and wherein each of said plurality of virtual windows is approximately on the order of between 1 and 2 Mb in size.

19. An addressing method as described in claim 15 wherein said step of loading comprises the step of loading said set data records from said disk.

20. An addressing method as described in claim 15 wherein said step of generating a plurality of virtual windows within said computer system comprises the steps of:
   generating a control block table for each of said plurality of virtual windows, said control block comprising a plurality of control block entries, each control block entry representing a page of virtual memory associated within a process; and generating a control block free list for each of said plurality of virtual windows, said control block free list indicating vacant entries within said control block table.

21. An addressing method as described in claim 20 wherein said step of generating a plurality of virtual windows within said computer system further comprises the steps of:

generating a hash table for each of said plurality of virtual windows, said hash table for maintaining a list of data records mapped within said virtual window and their corresponding mapped entries within said control block table; and maintaining a record number translator unit for each of said plurality of virtual windows, said record number translator unit for translating record numbers into relative page numbers which represent entries within said first table.

22. A computer system comprising a processor coupled to a bus, a disk coupled to said bus, and a computer readable memory unit coupled to said bus, said computer readable memory unit containing a computer program of instructions for causing said computer system to implement an addressing method for providing access of a very large physical memory space to a plurality of n processes, said addressing method comprising the computer implemented steps of:

generating a page table having a plurality of entries, each entry corresponding to at least one page within said large physical memory space, said plurality of entries defining a physical buffer;

loading a set of data records associated with a database application into said physical buffer;

generating a plurality of virtual windows within said computer system, each of said virtual windows associated with a process of said plurality of n processes, each of said virtual windows providing its associated process with a virtual address space with which said associated process can access said physical buffer, said virtual address space being substantially smaller than said physical buffer; and mapping a particular data record of said physical buffer into a virtual address space associated with a particular virtual window of said plurality of virtual windows, said step of mapping providing a particular process associated with said particular virtual window with access to said data record within said physical buffer.

23. A computer system as described in claim 22 further comprising the step of unmapping a particular mapped data record of said physical buffer from said virtual address space associated with said particular virtual window, said step of unmapping freeing an amount of virtual address space available to said particular process associated with said particular virtual window.

24. A computer system as described in claim 22 wherein said plurality of processes operate within a 32-bit operating system of said computer system and said large physical memory space is 64-bit addressable.

25. A computer system as described in claim 22 wherein said physical buffer is equal to or larger than 4 Gb in size and wherein each of said plurality of virtual windows is approximately on the order of between 1 and 2 Mb in size.

26. A computer system as described in claim 22 wherein said step of loading comprises the step of loading said set data records from said disk.

27. A computer system as described in claim 22 wherein said step of generating a plurality of virtual windows within said computer system comprises the steps of:

generating a control block table for each of said plurality of virtual windows, said control block comprising a plurality of control block entries, each control block entry representing a page of virtual memory associated within a process; and generating a control block free list for each of said plurality of virtual windows, said control block free list indicating vacant entries within said control block table.

28. A computer system as described in claim 27 wherein said step of generating a plurality of virtual windows within said computer system further comprises the steps of:

generating a hash table for each of said plurality of virtual windows, said hash table for maintaining a list of data records mapped within said virtual window and their corresponding mapped entries within said control block table; and maintaining a record number translator unit for each of said plurality of virtual windows, said record number translator unit for translating record numbers into relative page numbers which represent entries within said first table.

* * * * *